United States Patent
Chuang et al.

(10) Patent No.: US 7,180,560 B2
(45) Date of Patent: Feb. 20, 2007

(54) TRANSFLECTIVE LIQUID CRYSTAL DISPLAY

(75) Inventors: Li-Sen Chuang, Penghu Hsien (TW); Wei-Chih Chang, Hsinchu (TW); Chia-Yi Tsai, Ilan-Hsien (TW); Chi-Jain Wen, Hsinchu (TW)

(73) Assignee: TPO Displays Corp., Chu-Nan (TW)

( * ) Notice: Subject to any disclaimer, the term of this patent is extended or adjusted under 35 U.S.C. 154(b) by 198 days.

(21) Appl. No.: 10/964,031

(22) Filed: Oct. 12, 2004

(65) Prior Publication Data

US 2005/0168673 A1 Aug. 4, 2005

(30) Foreign Application Priority Data

Feb. 2, 2004 (TW) ............................ 93102273 A

(51) Int. Cl.
*G02F 1/1368* (2006.01)
*G02F 1/1335* (2006.01)

(52) U.S. Cl. ...................... 349/114; 349/42; 349/106; 349/109

(58) Field of Classification Search ................ 349/106, 349/107, 108, 109, 114, 113, 42
See application file for complete search history.

(56) References Cited

U.S. PATENT DOCUMENTS 6,909,479 B2 * 6/2005 Iijima ........................ 349/109
2006/0103794 A1 * 5/2006 Iijima et al. ................ 349/114

FOREIGN PATENT DOCUMENTS

JP 2002-350830 12/2002
JP 2003-121833 4/2003

* cited by examiner

*Primary Examiner*—Toan Ton
*Assistant Examiner*—Tai Duong
(74) *Attorney, Agent, or Firm*—Liu & Liu

(57) ABSTRACT

A transflective liquid crystal display has a plurality of pixel electrode layers corresponding to a plurality of color elements. A first pixel electrode layer has a first reflective region and a first transmissive region. A second pixel electrode layer has a second reflective region and a second transmissive region. A third pixel electrode layer has a third reflective region and a third transmissive region. The first reflective region is larger than the second reflective region, and the first reflective region is larger than the third reflective region.

20 Claims, 5 Drawing Sheets

TRANSFLECTIVE LIQUID CRYSTAL DISPLAY

BACKGROUND OF THE INVENTION

1. Field of the Invention

The invention relates to a transflective liquid crystal display and more particularly to the structuring of a reflective layer in the transflective LCD device to adjust chromatic properties between a reflective region and a transmissive region.

2. Description of the Related Art

Liquid crystal display (LCD) devices are typically classified as transmissive and reflective types according to the light source. The transmissive type LCD device uses a backlight module, in which incident light is absorbed, or passes through the LC layer, resulting in the disadvantages of faded color and reduced contrast ratio under a natural light source or an artificial exterior light source. Conversely, the reflective type LCD device uses ambient incident light from an exterior light source, resulting in superior performance and high contrast ratio under outdoor sunlight. Additionally, because of its low power consumption, the reflective type LCD device is found primarily in portable display products. The reflective type LCD device is however useless when the exterior light source is dark or blocked, and it is comparatively difficult to achieve high resolution for a full color display. Accordingly, transflective LCD devices have been developed to combine the advantages of the reflective type LCD device and the advantages found in transmissive type LCD devices. The transflective LCD device can employ well-known active driving processes, such as amorphous silicon thin film transistors (a-Si TFT) or low temperature polysilicon (LTPS) TFTs, which are applied to information products with low power consumption.

FIG. 1 is an exploded diagram of a conventional transflective LCD device. The transflective LCD device 10 comprises an upper substrate 12, a lower substrate 14, and a liquid crystal (LC) layer 16 interposed therebetween. On the inner surface of the lower substrate 14, a plurality of gate lines 18 and a plurality of data lines 20 intersect to define an array of pixel areas 22. Each of the pixel areas 22 comprises a pixel electrode layer 24 and a thin film transistor (TFT) device 26. The pixel electrode layer 24 has a transmissive region T and a reflective region R. The TFT device 26 is fabricated near the intersection of the gate line 18 and the data line 20, and is electrically connected to the corresponding pixel electrode layer 24.

On the inner surface of the upper substrate 12, a black matrix layer 28 is provided and has a plurality of openings corresponding to the pixel electrode layers 24, and a color filter layer 30 is formed in the openings of the black matrix layer 28. The color filter layer 30 is composed of a plurality of color element groups arranged in a designated form, and each color element group consists of a red element R, a green element G and a blue element B. In addition, a common electrode layer 32 is formed on the color filter layer 30.

Operation of the transflective LCD device 10 is described in the following. First, in reflective mode, external incident light is reflected from the reflective region R, and is directed toward the upper substrate 12. At this point, when electrical signals are applied to the reflective region R by the TFT device 26, the arrangement of LC molecules varies and thus the reflected light is colored by the color filter layer 30, thereby displaying a color image. Second, in transmissive mode, the light emitted from a backlight device passes through the transmissive region T. At this point, when the electrical signals are applied to the transmissive region T by the TFT device 26, the arrangement of LC molecules varies and thus the light passing through the transflective LCD device 10 is colored by the color filter layer 30, thereby forming a color image.

Since each pixel area 22 has a reflective region R and a transmissive region T, light passes through the color filter layer 30 twice in reflective mode, and only once in transmissive mode, resulting in color shift therebetween. In conventional designs for the pixel areas 22, the pixel measurements corresponding to the red element R, green element G and the blue element B are identical, thus limiting adjustment margin for improving chromatic properties of the reflective region R. In this case, the color image displayed is yellowish due to a yellowish white point problem in the reflective region R.

SUMMARY OF THE INVENTION

One aspect of the present invention is to provide a layout pattern for pixel electrode layers of a transflective LCD device in order to adjust chromatic properties in reflective regions, thus reducing the difference between chromaticity in the transmissive region and reflective region.

According to one embodiment of the invention, a transflective liquid crystal display includes a plurality of pixel electrode layers corresponding to a plurality of color elements. A first pixel electrode layer has a first reflective region and a first transmissive region. A second pixel electrode layer has a second reflective region and a second transmissive region. A third pixel electrode layer has a third reflective region and a third transmissive region. The first reflective region is larger than the second reflective region, and the first reflective region is larger than the third reflective region.

DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

The present invention provides several layout patterns for pixel electrode layers of a transflective LCD device in order to appropriately modify a measurement ratio of a blue reflective region to a green reflective region to a red reflective region. The measurement ratio can adjust chromatic properties of the blue reflective region to promote white point uniformity. Preferably, the blue reflective region is larger than the green reflective region, and is larger than the red reflective region.

First Embodiment

The present invention modifies RGB pixel electrode layers to obtain different sizes of RGB reflective regions on the condition that the RGB pixel electrode layers have identical transmissive regions.

Figure 1:
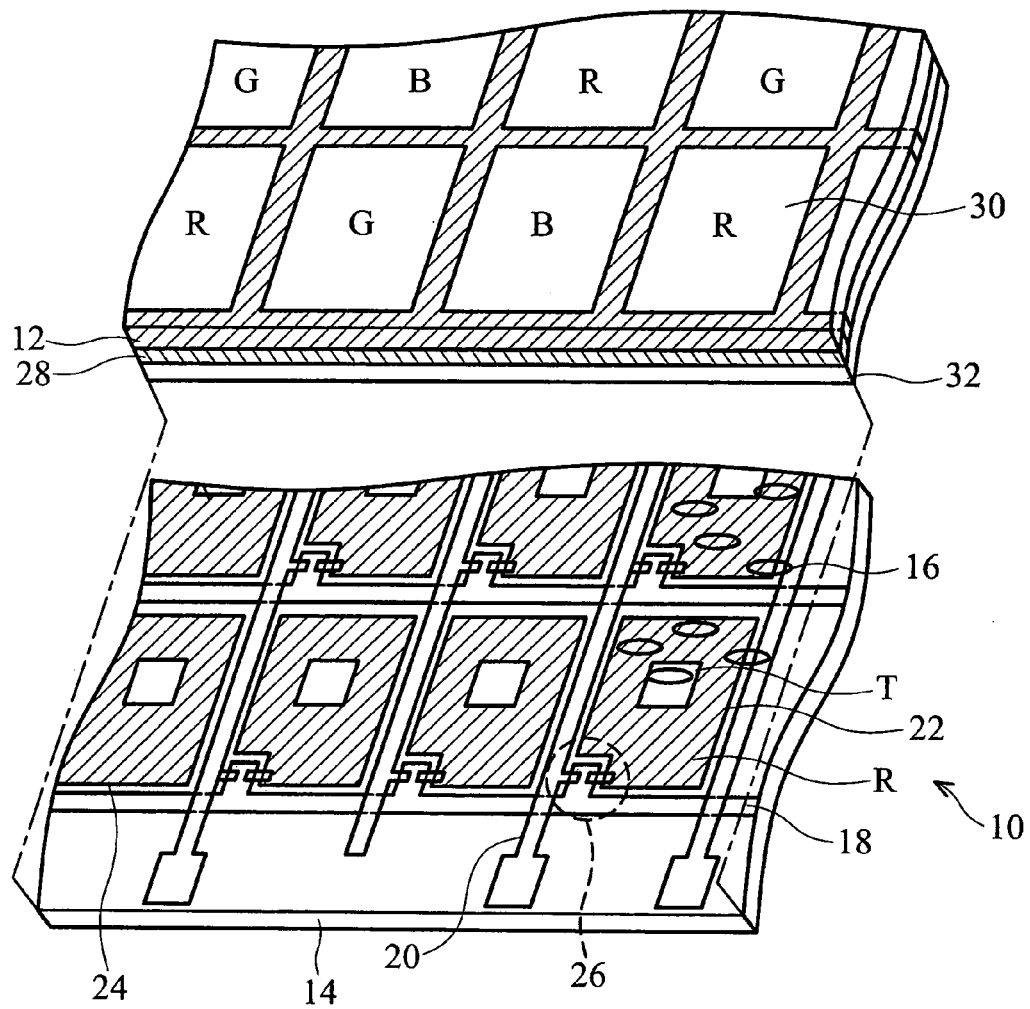
FIG. 1 is an exploded diagram of a conventional transflective LCD device.
Figure 2:
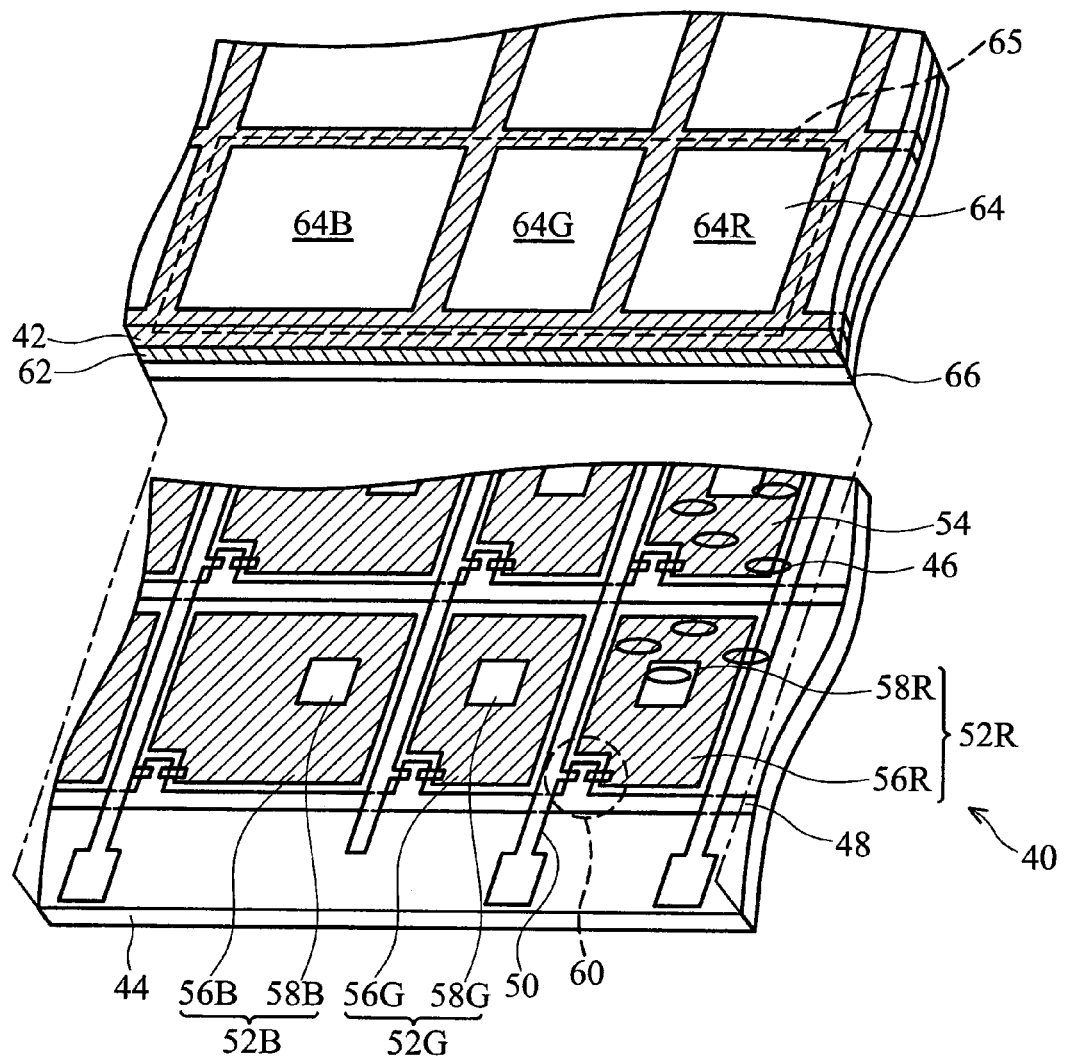
FIG. 2 is an exploded diagram of a transflective LCD device according to the first embodiment of the present invention.

FIG. 2 is an exploded diagram of a transflective LCD device according to the first embodiment of the present invention. A transflective LCD device 40 comprises an upper substrate 42, a lower substrate 44 and a liquid crystal layer 46 formed in a space between the upper substrate 42 and the lower substrate 44. On the inner surface of the lower substrate 44, a plurality of gate lines 48 extending in a traverse direction and a plurality of data lines 50 extending in a lengthwise direction intersect to define an array of pixel areas 54. Each pixel area 54 comprises a pixel electrode region 52 and a TFT device 60 electrically connected to each other. The pixel electrode region 52 has a reflective region 56 and a transmissive region 58. The TFT device 60 is fabricated near the intersection of the gate line 48 and the data line 50.

On the inner surface of the upper substrate 42, a black matrix layer 62 has openings corresponding to the pixel electrode region 52, a color filter layer 64 is formed in the openings of the black matrix layer 62, and a common electrode layer 66 is formed on the color filter layer 64. The color filter layer 64 is composed of a plurality of color element groups 65 arranged in a specific form, and each color element group 65 consists of a red element 64R, a green element 64G and a blue element 64B. The position and size of the color elements 64R, 64G and 64B substantially correspond to the pixel electrode regions 52R, 52G and 52B.

For example, the red pixel electrode region 52R, corresponding to the red element 64R, has a red reflective region 56R and a red transmissive region 58R. The green pixel electrode region 52G, corresponding to the green element 64G, has a green reflective region 56G and a green transmissive region 58G. The blue pixel electrode region 52B, corresponding to the blue element 64B, has a blue reflective region 56B and a blue transmissive region 58B.

A size design rule for the pixel electrode regions 52R, 52G, and 52B is now described. An area $A_{52B}$ of the blue pixel electrode region 52B, an area $A_{52R}$ of the red pixel electrode region 52R and an area $A_{52G}$ of the green pixel electrode region 52G satisfy the formulas: $A_{52B} \neq A_{52R}$ and $A_{52B} \neq A_{52G}$. In one embodiment, $A_{52B} > A_{52R}$ and $A_{52B} > A_{52G}$, in a second embodiment, $A_{52B} > A_{52R} > A_{52G}$ and in a third embodiment, $A_{52B} > A_{52R} = A_{52G}$. (All areas refer to active transmission areas that affect chromaticity, which may be different from the physical overall sizes of the areas.)

A size design rule for the transmissive regions 58R, 58G, and 58B is now described. An area $A_{58B}$ of the blue transmissive region 58B, an area $A_{58R}$ of the red transmissive region 58R and an area $A_{58G}$ of the green transmissive region 58G satisfy the formula: $A_{58B} = A_{58R} = A_{58G}$.

Accordingly, an area $A_{56B}$ of the blue reflective region 56B, an area $A_{56R}$ of the red reflective region 56R and an area $A_{56G}$ of the green reflective region 56G satisfy the formula: $A_{56B} \neq A_{56R}$ and $A_{56B} \neq A_{56G}$. In one embodiment, $A_{56B} > A_{56R}$ and $A_{56B} > A_{56G}$, in a second embodiment, $A_{56B} > A_{56R} = A_{56G}$, and in a third embodiment, $A_{56B} > A_{56R} > A_{56G}$. In yet another embodiment, $A_{56B}:A_{56R}:A_{56G} = (1.1\sim2.0):(0.8\sim1.0):(0.8\sim1.0)$. Since a larger margin is provided for adjusting chromatic properties of the blue reflective region 56B, white point uniformity can be achieved to solve the yellowish image problem.

The red element 64R, the green element 64G and the blue element 64B may be arranged in a strip type, a mosaic type or a delta type array arrangements known in the art, subject to the relative size requirements of the present invention. The black matrix layer 62 may be omitted and the light-shielding function can be replaced by fabricating an overlapping portion between adjacent color elements. In addition, the color filter layer 64 may be fabricated on the lower substrate 44.

Second Embodiment

Based on the size design rules described in the first embodiment, the present invention further provides a transparent region (or an opening) in the red element 64R, the green element 64G or the blue element 64B. Additionally, the projection of the transparent region onto the lower substrate 44 is within the corresponding reflective region 56. Cooperating with backlight source adjustment, a reflective light passing through the transparent region in reflective mode displays a non-colored light, thus increasing brightness and aiding white point adjustment in reflective mode.

Figure 3A:
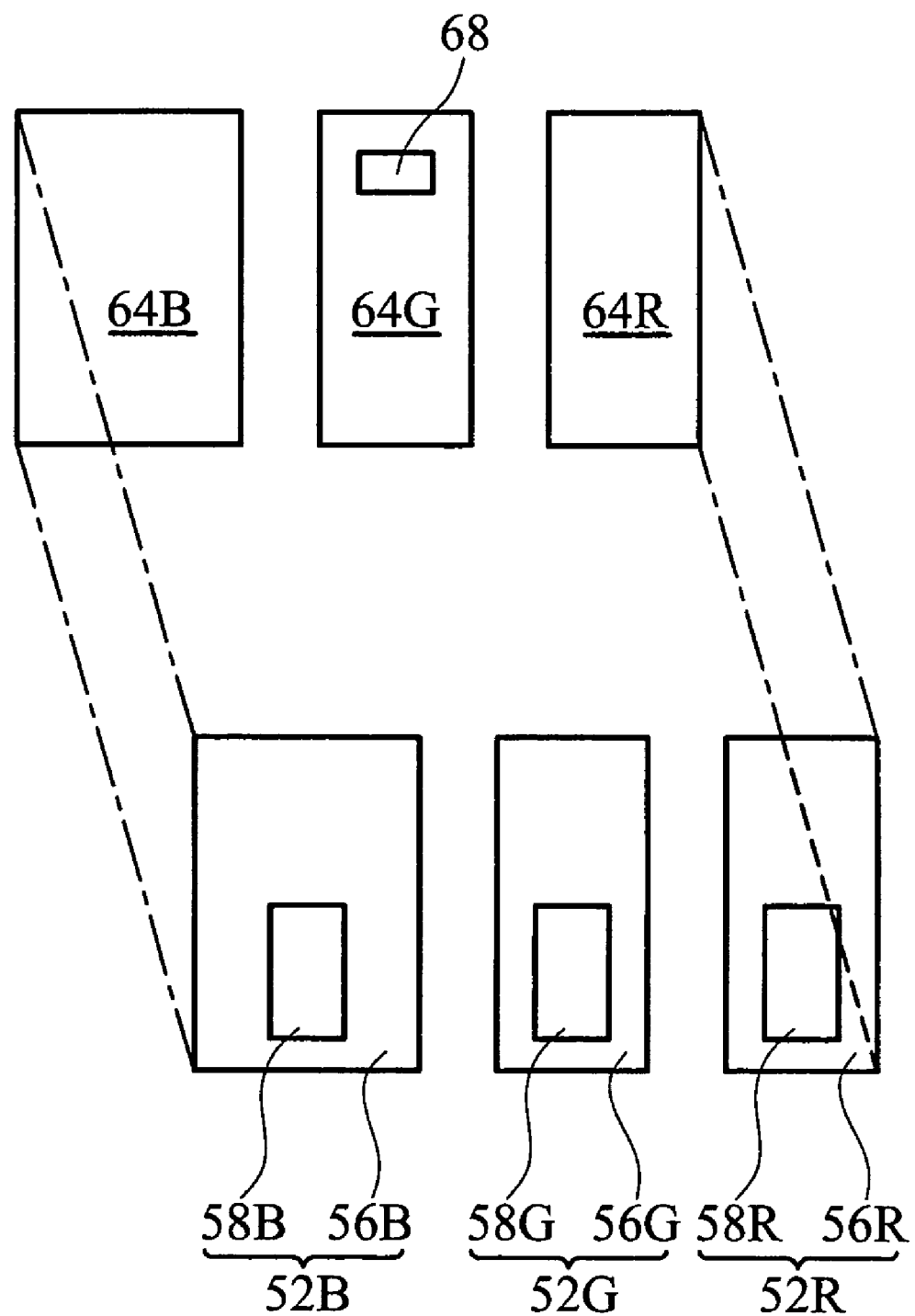
FIG. 3A is an exploded diagram of color elements and pixel electrode layers according to the second embodiment of the present invention.

FIG. 3A is an exploded diagram of color elements and pixel electrode regions according to the second embodiment of the present invention. The color elements 64R, 64G and 64B and pixel electrode regions 52R, 52G and 52B in the second embodiment are substantially similar to those of the first embodiment, with the similar portions omitted herein. The green element 64G has a transparent region (or an opening) 68, and the projection of the transparent region 68 onto the lower substrate 44 is within the green reflective region 56G. In reflective mode, a reflective light passing through the transparent region 68 displays a non-colored light, thus increasing brightness and aiding white point adjustment.

Figure 3B:
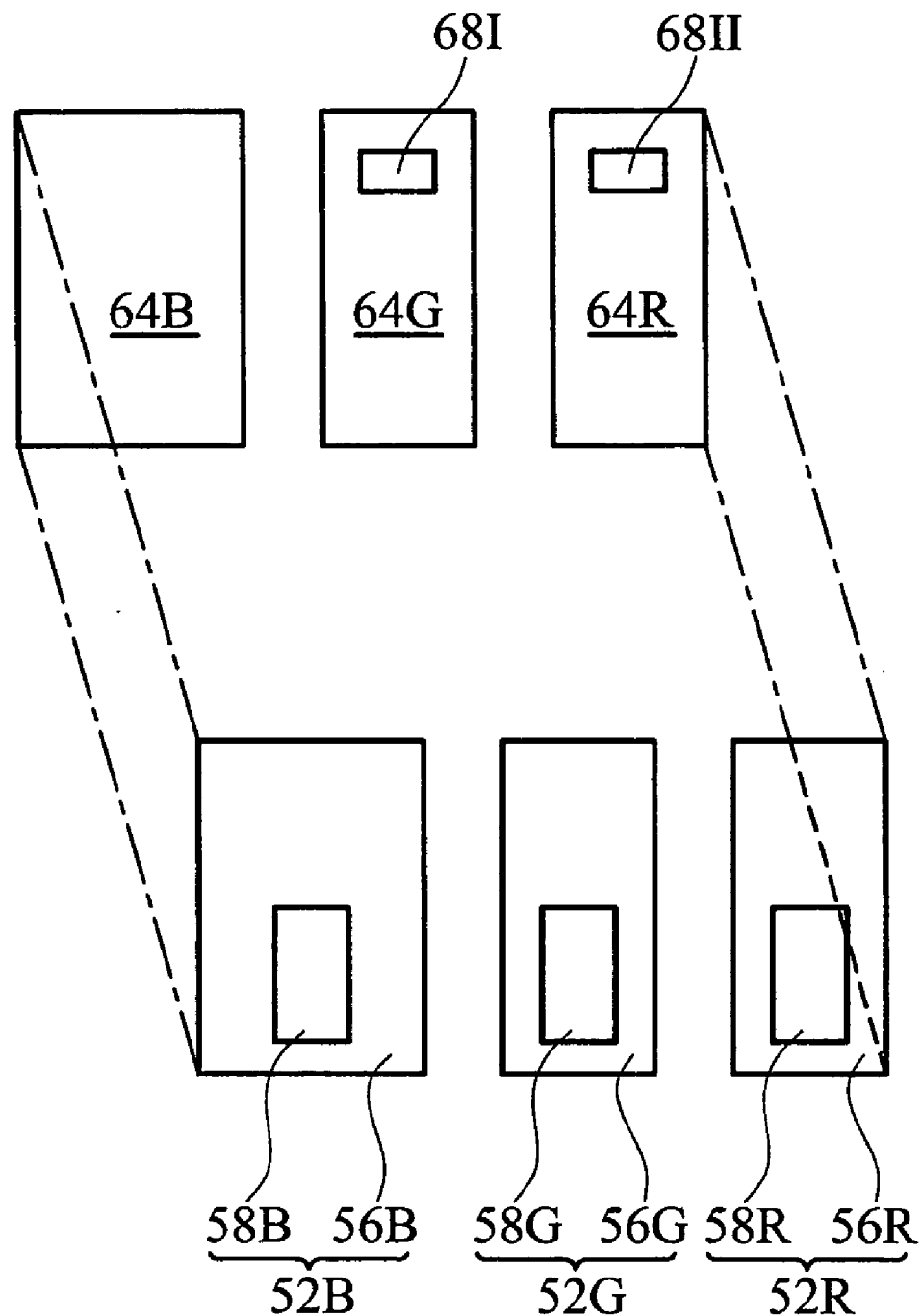
FIG. 3B is an exploded diagram of color elements and pixel electrode layers according to the second embodiment of the present invention.

FIG. 3B is an exploded diagram of color elements and pixel electrode regions according to the second embodiment of the present invention. The color elements 64R, 64G and 64B and pixel electrode regions 52R, 52G and 52B in FIG. 3B are substantially similar to those of FIG. 3A, with the similar portions omitted herein. The green element 64G has a first transparent region 68I, and the projection of the first transparent region 68I onto the lower substrate 44 is within the green reflective region 56G. Also, the red element 64R has a second transparent region 68II, and the projection of the second transparent region 68II onto the lower substrate 44 is in the red reflective region 56R. In reflective mode, a reflective light passing through the transparent regions 68I, and 68II display non-colored lights, thus increasing brightness and aiding white point adjustment. The profile and size designs for the transparent regions 68I and 68II are not limited. Preferably, the first transparent region 68I is larger than the second transparent region 68II.

Figure 4:
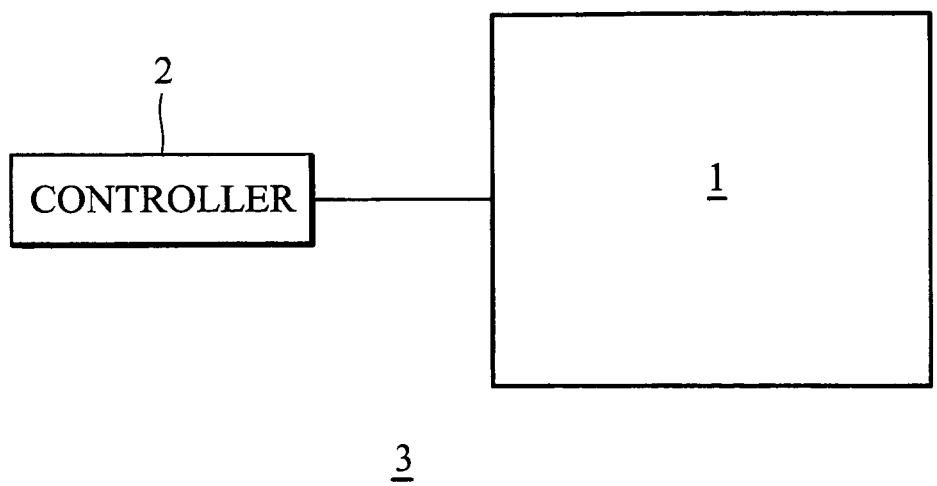
FIG. 4 is a schematic diagram illustrating a LCD device incorporating the transflective LCD panel in accordance with one embodiment of the present invention.

FIG. 4 is a schematic diagram illustrating a LCD device incorporating the transflective LCD panel in accordance with one embodiment of the present invention. The transflective LCD panel 1 (for example, as shown in FIG. 3A) is coupled to a controller 2 to form a liquid crystal display device 3. The controller 2 can comprise a source and gate driving circuits (not shown) to control the LCD panel 1 to render image in accordance with an input.

Figure 5:
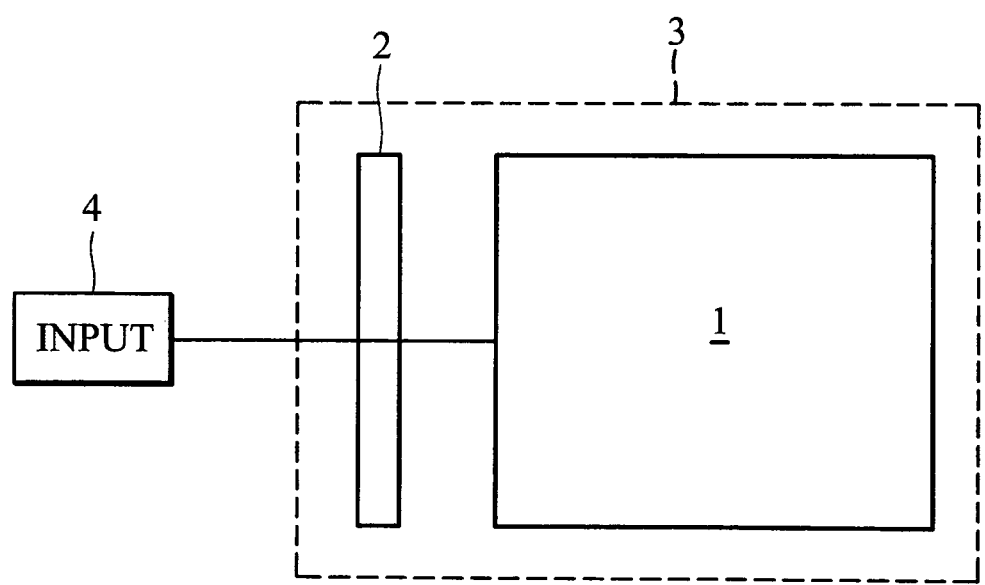
FIG. 5 is a schematic diagram illustrating an electronic device incorporating the LCD device shown in FIG. 4.

FIG. 5 is a schematic diagram illustrating an electronic device incorporating the LCD device 3 shown in FIG. 4. An input device 4 is coupled to the controller 2 of the LCD device 3 shown in FIG. 4 to form an electronic device 5. The input device 4 can include a processor or the like to input data to the controller 2 to render an image. The electronic device 5 may be a portable device such as a PDA (personal digital assistant), notebook computer, tablet computer, cellular phone, or a display monitor device, or non-portable device such as a desktop computer.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A transflective liquid crystal display, comprising:
   a first pixel electrode region comprising a first reflective region and a first transmissive region; and
   a second pixel electrode region comprising a second reflective region and a second transmissive region;
   wherein, the first reflective region is larger than the second reflective region, and the first pixel electrode region is larger than the second pixel electrode region.

2. The transflective liquid crystal display as claimed in claim 1, wherein the transflective liquid crystal display further comprises a third pixel electrode region comprising a third reflective region.

3. The transflective liquid crystal display as claimed in claim 2, wherein a measurement ratio of the first reflective region to the second reflective region to the third reflective region is (1.1~2.0):(0.8~1.0):(0.8~1.0).

4. The transflective liquid crystal display as claimed in claim 2, wherein the second reflective region is approximately equal to or smaller than the third reflective region.

5. The transflective liquid crystal display as claimed in claim 2, wherein the first pixel electrode region is larger than the third pixel electrode region, and the first reflective region is larger than the third reflective region.

6. The transflective liquid crystal display as claimed in claim 2, wherein the first transmissive region is approximately equal to the second transmissive region, and the first transmissive region is approximately equal to the third transmissive region.

7. The transflective liquid crystal display as claimed in claim 2, further comprising:
   a first color element corresponding in position and size to the first pixel electrode region;
   a second color element corresponding in position and size to the second pixel electrode region; and
   a third color element corresponding in position and size to the third pixel electrode region.

8. The transflective liquid crystal display as claimed in claim 7, wherein the first color element is a blue layer, the second color element is a green layer and the third color element is a red layer.

9. The transflective liquid crystal display as claimed in claim 7, further comprising:
   a first transparent region formed in the second color element;
   wherein, the projection of the first transparent region is onto the second reflective region.

10. The transflective liquid crystal display as claimed in claim 7, further comprising:
    a second transparent region formed in the third color element;
    wherein, the projection of the second transparent region is onto the third reflective region.

11. The transflective liquid crystal display as claimed in claim 7, further comprising:
    a first transparent region formed in the second color element, in which the projection of the first transparent region is onto the second reflective region; and
    a second transparent region formed in the third color element, in which the projection of the second transparent region is onto the third reflective region.

12. The transflective liquid crystal display as claimed in claim 11, wherein the second transparent region is smaller than the first transparent region.

13. The transflective liquid crystal display as claimed in claim 2, further comprising:
    a first substrate;
    a second substrate;
    a liquid crystal layer formed in a space between the first substrate and the second substrate;
    a plurality of gate lines formed overlying the second substrate;
    a plurality of data lines formed overlying the second substrate, in which the gate lines and the data lines intersect to define a plurality of pixel areas; and
    a plurality of thin film transistors formed overlying the second substrate, in which each thin film transistor is formed near the intersection of the gate line and the data line within each pixel area;
    wherein, the first pixel electrode layer, the second pixel electrode layer and the third pixel electrode layers are formed overlying the pixel areas, respectively.

14. A transflective liquid crystal display device, comprising:
    the transflective liquid crystal display as claimed in claim 1; and
    a controller coupled to the transflective liquid crystal display to render an image in accordance with an input.

15. An electronic device, comprising:
    the transflective liquid crystal display device as claimed in claim 14; and
    an input device coupled to the controller of the transflective liquid crystal display device to control the display device to render an image.

16. A transflective liquid crystal display, comprising:
    a first pixel color region comprising a first reflective region and a first transmissive region;
    a first color element corresponding to the first reflective region;
    a second pixel color region comprising a second reflective region and a second transmissive region;
    a second color element corresponding to the second reflective region;
    wherein area of the first color element is larger than area of the second color element, and the first pixel color region is larger than the second pixel color region.

17. The transflective liquid crystal display as claimed in claim 16, further comprising:
    a first transparent region formed in the second color element, wherein projection of the first transparent region is onto the second reflective region.

18. The transflective liquid crystal display as claimed in claim 16, further comprising:

a third pixel color region comprising a third reflective region and a third transmissive region;

a third color element corresponding to the third reflective region;

a second transparent region formed in the third color element, wherein projection of the second transparent region is onto the third reflective region.

19. The transflective liquid crystal display as claimed in claim 18, wherein the second transparent region is smaller than the first transparent region.

20. A transflective liquid crystal display, comprising:

a first pixel color region comprising a first reflective region and a first transmissive region;

a first color element corresponding to the first reflective region;

a second pixel color region comprising a second reflective region and a second transmissive region;

a second color element corresponding to the second reflective region, wherein area of the first color element is larger than area of the second color element;

a first transparent region formed in the second color element, wherein projection of the first transparent region is onto the second reflective region.

* * * * *